United States Patent
Flick

(10) Patent No.: US 6,480,098 B2
(45) Date of Patent: Nov. 12, 2002

(54) REMOTE VEHICLE CONTROL SYSTEM INCLUDING COMMON CARRIER PAGING RECEIVER AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 0 days.

(21) Appl. No.: 09/039,204

(22) Filed: Mar. 13, 1998

(65) Prior Publication Data

US 2002/0130765 A1 Sep. 19, 2002

(51) Int. Cl.$^7$ ................................................. G08B 5/22
(52) U.S. Cl. .......................... 340/7.2; 340/7.1; 340/426; 340/539; 340/5.41; 340/5.64; 340/5.72; 307/10.2
(58) Field of Search ........................... 340/825.44, 426, 340/539, 541, 825.69, 7.2, 7.1, 7.25, 5.64, 5.72; 307/10.2

(56) References Cited

U.S. PATENT DOCUMENTS

| | | | |
|---|---|---|---|
| 4,905,271 A | | 2/1990 | Namekawa .................... 379/58 |
| 4,924,206 A | | 5/1990 | Ayers ........................... 340/426 |
| 5,027,104 A | | 6/1991 | Reid ............................. 340/541 |
| 5,216,407 A | | 6/1993 | Hwang ......................... 340/426 |
| 5,276,728 A | | 1/1994 | Pagliaroli et al. ............. 379/58 |
| 5,335,264 A | | 8/1994 | Namekawa .................... 379/58 |
| 5,739,748 A | * | 4/1998 | Flick ............................ 340/426 |
| 5,838,255 A | | 11/1998 | Di Croce ................. 340/825.69 |
| 5,917,405 A | * | 6/1999 | Joao ............................. 340/426 |
| 5,926,086 A | * | 7/1999 | Escareno et al. ............ 340/426 |
| 5,939,975 A | * | 8/1999 | Tsuria et al. ................. 340/426 |
| 6,028,505 A | * | 2/2000 | Drori ........................... 340/426 |

OTHER PUBLICATIONS

CREATALINK™ Brochure, pp. 1–6 (1997).
CREATALINK™ One–way Data Receiver/Control Module Brochure pp. 1–2 (1997).
CREATALINK2™ FLEX Two–Way Data Transceiver Brochure pp. 1–2 (1997).
Press Release, "Motorola Introduces Wireless Automotive Solution For Controlling In–Vehicle Functions," pp. 1–3, Dec. 10, 1997.

\* cited by examiner

Primary Examiner—Brian Zimmerman
Assistant Examiner—Yves DaLencourt
(74) Attorney, Agent, or Firm—Allen, Dyer, Doppelt, Milbrath & Gilchrist, P.A.

(57) ABSTRACT

A vehicle remote control system includes a common carrier paging receiver and an adapted remote transmitter coupled to the paging receiver to communicate with the system function controller. The system preferably includes a plurality of transmitters including at least one first transmitter for being carried by a user, and a first receiver positioned at the vehicle for receiving signals from the transmitters. The function controller is connected to wiring at the vehicle and to the first receiver. The system also preferably includes the second or paging receiver positioned at the vehicle for receiving signals via the common carrier paging network and for generating output control signals responsive to received signals from the common carrier paging network. In addition, the transmitters preferably further include a slightly modified remote transmitter connected to the second paging receiver for communicating output control signals to the controller and via the first receiver.

29 Claims, 3 Drawing Sheets

REMOTE VEHICLE CONTROL SYSTEM INCLUDING COMMON CARRIER PAGING RECEIVER AND RELATED METHODS

FIELD OF THE INVENTION

The present invention relates to the field of vehicle control systems and related methods, and more particularly, to a vehicle remote control system and method.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or movement within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A number of patents disclose radio transmitters in a vehicle security system for alerting a user away from the vehicle via a dedicated receiver carried by the vehicle owner. For example, U.S. Pat. No. 4,924,206 to Ayers discloses such a conventional system. Along these lines, U.S. Pat. No. 5,027,104 to Reid discloses a vehicle security system including vehicle mounted cameras that may alert the vehicle owner via a dedicated receiver, and while also sending a video signal to a second receiver location. U.S. Pat. No. 5,216,407 to Hwang discloses a vehicle security system including a paging system for providing an output to send a warning signal to the vehicle owner's pager or portable phone. U.S. Pat. No. 5,276,728 to Pagliaroli et al. discloses a vehicle security system wherein the user carries a portable receiver, and can disable the vehicle by dialing an appropriate code via a cellular telephone.

U.S. Pat. No. 5,335,264 to Namekawa discloses a vehicle security system including a handheld unit which, in turn, includes a transmitter and receiver. The remote receiver can receive an alarm signal from the vehicle, and a cellular telephone within the vehicle can be used to collect sounds from within the vehicle. The Namekawa patent, U.S. Pat. No. 4,905,271, also discloses a vehicle security system wherein the cellular telephone is turned on responsive to an alarm and which enables the driver to determine the state of the security system by calling the mobile telephone system before running to the car.

Another recent advance in the area of remote control of vehicle security systems is provided by the CREATALINK™ one-way data receiver/control module available from Motorola and based upon conventional common carrier paging technology. The CREATALINK™ system includes a paging receiver operating in the 929 to 932 MHZ paging band and which also provides a number of user programmable outputs. More particularly, the user may dial a telephone number to remotely unlock and lock power doors, start a vehicle engine, disable a vehicle engine and engage an alarm indication, for example.

Unfortunately, despite the potential advantages provided by the CREATALINK™ system, installation into vehicles already equipped with a security system or remote keyless entry system may be relatively difficult. Original installations may also be relatively complicated because of the need to connect the paging module to existing vehicle wiring. The labor to install the paging/control module and connect its outputs to the various harnesses and wires in the vehicle may be especially time consuming.

SUMMARY OF THE INVENTION

In view of the foregoing background, it is therefore an object of the present invention to provide a remote vehicle control security system incorporating remote paging control and which can be readily installed or retrofitted to a vehicle.

This and other objects, features and advantages in accordance with the present invention are provided by a vehicle remote control system including a slightly modified remote transmitter coupled to the paging receiver to communicate with the system controller. Accordingly, harnesses need not be custom fabricated and existing wiring need not be disturbed to the controller, such as for a retrofit installation. For a new complete system installation, the transmitter providing the link from the paging receiver to the controller permits the paging receiver to be located in spaced relation from the controller, such as to improve reception to the paging receiver. More particularly, the remote vehicle control system preferably includes a plurality of transmitters comprising at least one first transmitter for being carried by a user, a first receiver positioned at the vehicle for receiving signals from the plurality of transmitters, and the controller positioned at the vehicle and being connected to wiring at the vehicle and to the first receiver for controlling at least one vehicle function responsive to the plurality of transmitters.

Moreover, the system also preferably includes the second or paging receiver positioned at the vehicle for receiving signals via a common carrier paging network and for generating output control signals responsive to received signals from the common carrier paging network. In addition, the plurality of transmitters preferably further includes a second transmitter positioned at the vehicle and connected to the second receiver for communicating output control signals to the controller and via the first receiver. In other words, a relatively inexpensive remote transmitter can be adapted to interface the paging receiver to the vehicle control system.

The paging receiver may include a plurality of power inputs for connection to vehicle power. The second transmitter may also include power inputs connected in parallel with the power inputs of the second receiver. The output signals from the second receiver are preferably communicated to the controller only via the second transmitter and the first receiver. In other words, in this embodiment the only common electrical connections are the power supply connections of the vehicle and no special harnesses or other wiring is needed to install the paging receiver and have it operate in conjunction with the controller.

In one embodiment the controller is switchable between armed and disarmed modes responsive to the plurality of transmitters. An alarm indicator may also be connected to the controller for sounding an alarm at the vehicle responsive to the plurality of transmitters and/or to one or more vehicle security sensors. Of course, the controller may comprise door lock control means for controlling locking and unlocking of vehicle doors responsive to the plurality of transmitters. Accordingly, the user could have the remote control system unlock the vehicle doors by calling an appropriate common carrier pager service telephone number, entering a unique personal identification number, and entering a door unlock command. Such a feature would be invaluable if the user locked the vehicle keys in the vehicle, for example.

The controller may also include engine disabling means for disabling the vehicle engine responsive to the plurality of transmitters. Accordingly, should the vehicle be stolen, the user may also dial into the common carrier paging service and activate a command to disable the engine.

The second transmitter preferably comprises a plurality of inputs for receiving respective pulsed input signals. Accordingly, the second receiver also preferably comprises means for generating a plurality of pulsed output signals to the inputs of the second transmitter.

At least one wiring harness may be connected at one end to the controller for interfacing the controller to wiring at the vehicle. In addition to the one-way paging feature described above, two-way paging could also be implemented if it was desired to enable a user to call his vehicle and obtain certain status information.

A method aspect of the invention is for retrofitting a paging remote control system to an existing vehicle control system 5. The existing vehicle control system is preferably of a type comprising at least one first transmitter for being carried by a user, a first receiver positioned at the vehicle for receiving signals from the plurality of transmitters, and a controller positioned at the vehicle and being connected to wiring at the vehicle and to the first receiver for controlling at least one vehicle function responsive to the at least one transmitter. The method preferably comprises the steps of: positioning a second receiver at the vehicle for receiving signals via a common carrier paging network and for generating output control signals responsive to received signals from the common carrier paging network; and positioning a second transmitter at the vehicle and connecting the second transmitter to the second receiver for communicating output control signals therefrom to the controller and via the first receiver.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
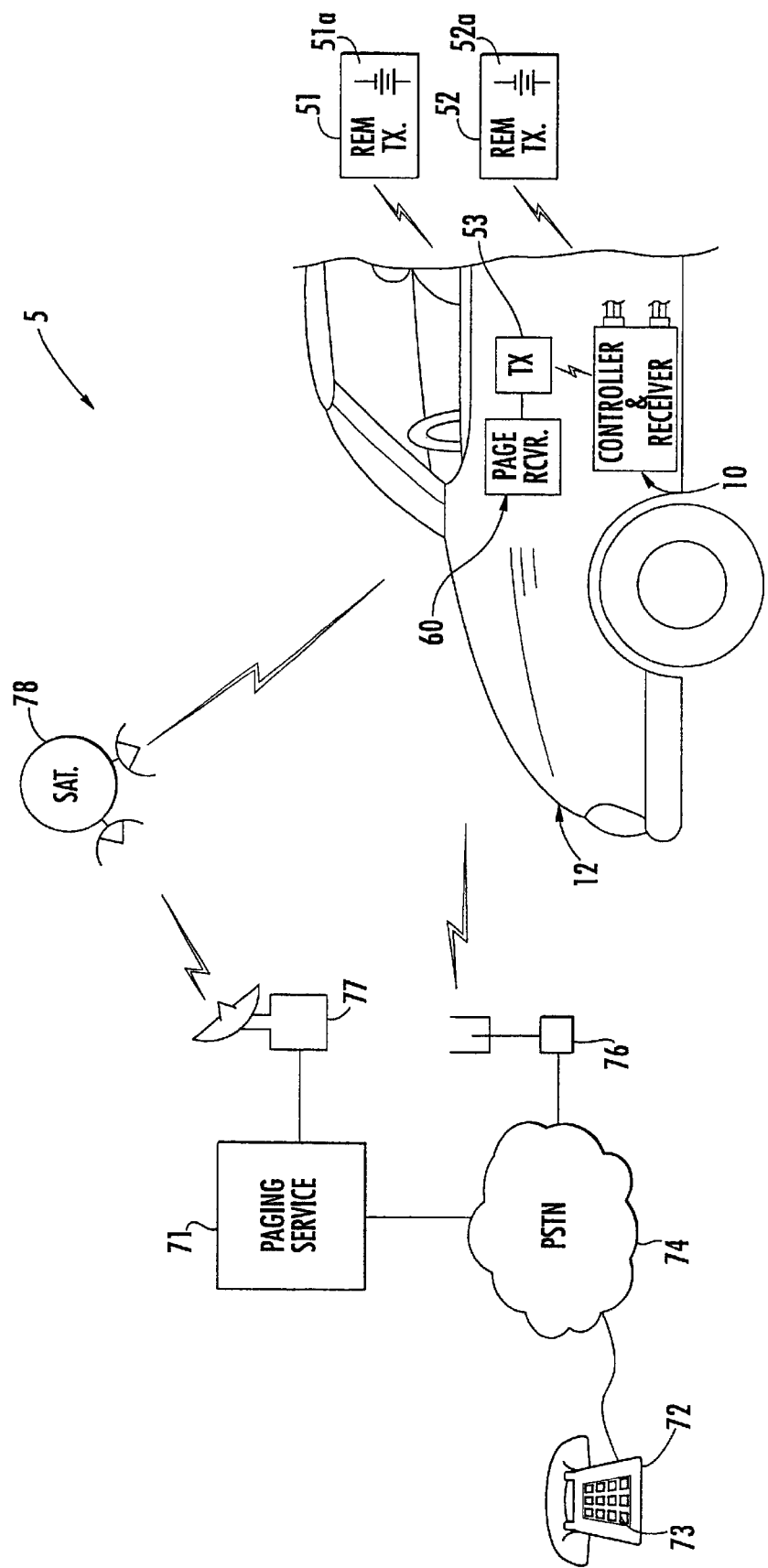
FIG. 1 is a schematic diagram of the vehicle function control system in accordance with the present invention.
Figure 2:
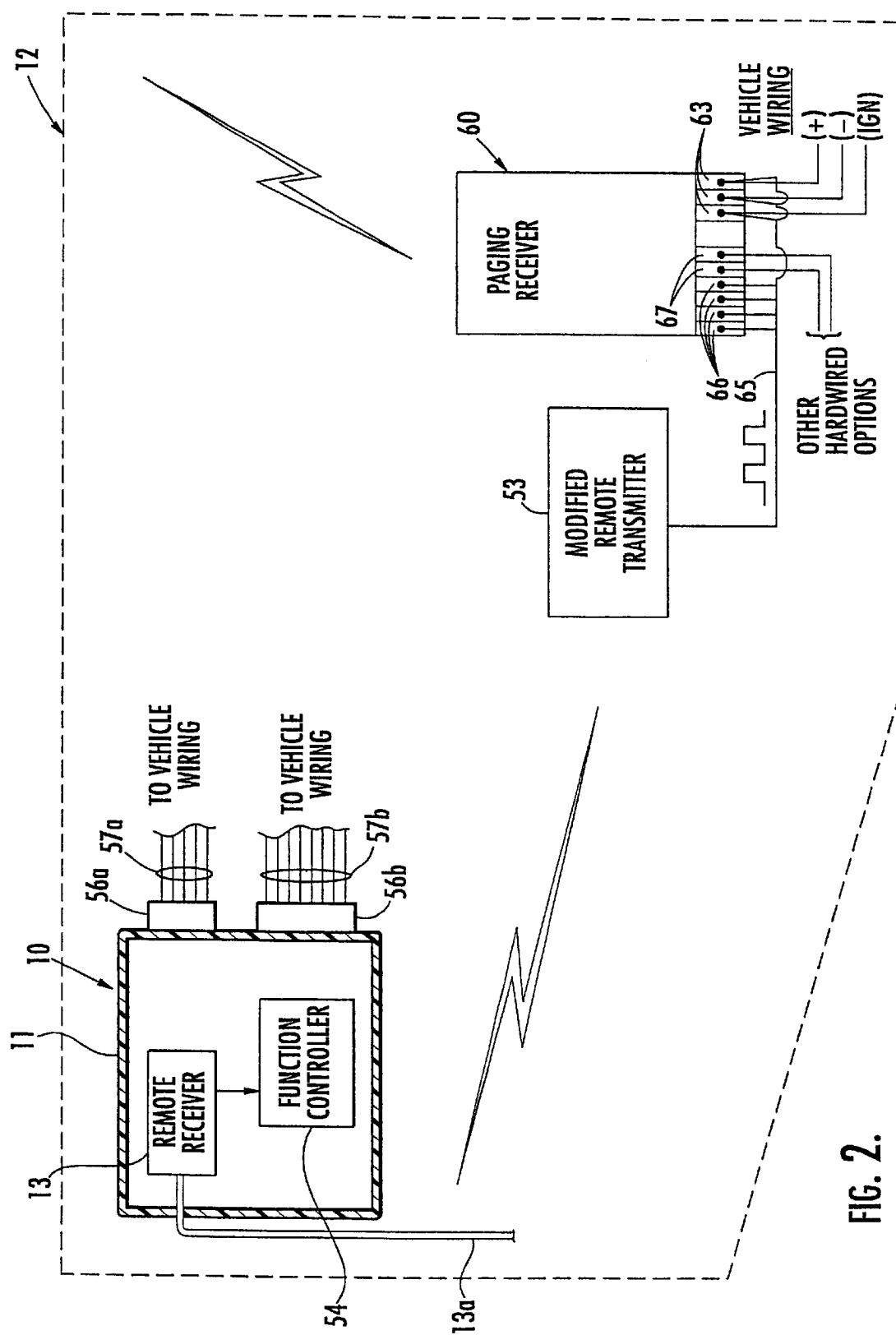
FIG. 2 is a more detailed schematic block diagram of the vehicle mounted components as shown in FIG. 1.

Referring initially to FIGS. 1 and 2, the remote vehicle function control system 5 in accordance with the present invention is first described. The system 5 includes a transmitter 53 coupled to the paging receiver 60 to communicate with the system controller/receiver 10. The illustrated remote vehicle control system 5 includes a plurality of transmitters 51–53 of which two transmitters 51, 52 are illustratively of the conventional handheld type for being carried by a user as will be readily appreciated by those skilled in the art. The third transmitter 53 is a modified version of a conventional remote transmitter as will be readily appreciated by those of skill in the art. The handheld transmitter 51, 52 may be powered by respective batteries 51a, 52b, while the transmitter 53 connected to the paging receiver 60 is powered from the vehicle. In other words, a relatively inexpensive remote transmitter 53 can be adapted to interface the paging or second receiver 60 to the vehicle control system 5.

The paging receiver 60 may of a type available from Motorola of Boynton Beach, Florida under the mark CRE-ATALINK™. Of course, those of skill in the art will readily appreciate that other manufacturers' paging receivers may also be used in accordance with the present invention.

A first receiver 13 is illustratively part of a control system module 10 positioned at the vehicle 12 for receiving signals from the plurality of transmitters 51–53. The function controller 54 is also positioned at the vehicle 12. Both the first receiver 13 and the function controller 54 may be contained within a common housing 11 as illustrated. Of course, in other embodiments, the receiver 13 and function controller 54 may be spaced from one another. The receiver 13 is also illustratively connected to an a antenna 13a in the form of a wire as shown in FIG. 2.

The security system module 10 is connected to wiring at the vehicle via the illustrated connectors 56a, 56b and the groups of conductors 57a, 57b as will be readily appreciated by those skilled in the art. The controller 54 is also connected to the first receiver 13 for controlling at least one vehicle function responsive to the plurality of transmitters 51–53.

Since the transmitter 53 is used to interface the paging receiver 60 to the control system module 10, and since the control system module is connected to the vehicle wiring, the connections to the vehicle wiring to install the paging receiver 60 may be minimal. For example, for the illustrated embodiment, only three relatively easy to access connections for the paging receiver 60 are required: (+), (−), and a switched ignition source as will be appreciated by those skilled in the art. The connections may be made at the respective input terminals 63 of the paging receiver 60 as shown. Accordingly, harnesses need not be custom fabricated and existing wiring need not be disturbed to the control system module 10, such as for a retrofit installation. For a new complete system installation, the transmitter 53 providing the link from the paging receiver 60 to the function controller 54 permits the paging receiver to be located in spaced relation from the controller, such as to improve reception to the paging receiver.

The second or paging receiver 60 positioned at the vehicle 12 is for receiving signals via a common carrier paging network and for generating output control signals responsive to received signals from the common carrier paging network. The common carrier paging network in the illustrated embodiment includes a central location for a paging service 71. The paging service 71 may receive a telephone call from a user via a conventional telephone 72 connected to the paging service via the Public Switched Telephone Network (PSTN) 74 as will be readily appreciated by those skilled in the art. The caller may be guided through a menu of voice message prompts to enter a unique personal identification code, and then through a list of optional vehicle control functions. The user may enter the requested information, for example, using a conventional touch tone keypad 73.

After the user has been identified and the desired remote control vehicle function selected, the paging service 71 may send out respective paging signals via one or more land-based towers 76, and/or via a satellite ground station 77 to a satellite 78 for relay to the vehicle 12. The signals to the towers or ground station may be sent directly or via the PSTN 74 as will be readily appreciated by those skilled in the art.

The paging receiver 60 may include a plurality of power inputs for connection to vehicle power as shown in FIG. 2. The transmitter 53 may also include power inputs connected in parallel with the power inputs of the paging receiver 60. The output signals from the paging receiver 60 are coupled to the transmitter 53 via one or more wires 65 which, in turn, are connected to the respective output terminals 66. The output terminals 66 may provide pulsed or continuous outputs, or a databus may be established between the paging receiver 60 and the transmitter 53. The paging receiver 60 may have a programmable microprocessor associated therewith so that the desired signal format/protocol is impressed on the outputs 65. In one embodiment of the invention, the only common electrical connections between the control module 10 and the paging receiver 60 and transmitter 53 are the common power supply connections of the vehicle. In other embodiments, the paging receiver 60 may have other outputs 67 for optional hardwired connections to certain vehicle components. For example, if the control module was for only remote keyless entry (RKE) the outputs 67 could be connected to a starter interrupt relay to also provide a remote security feature to the RKE system as would be readily appreciated by those skilled in the art. The outputs 67 may also be coupled to a garage door opening transmitter, not shown, for example.

Figure 3:
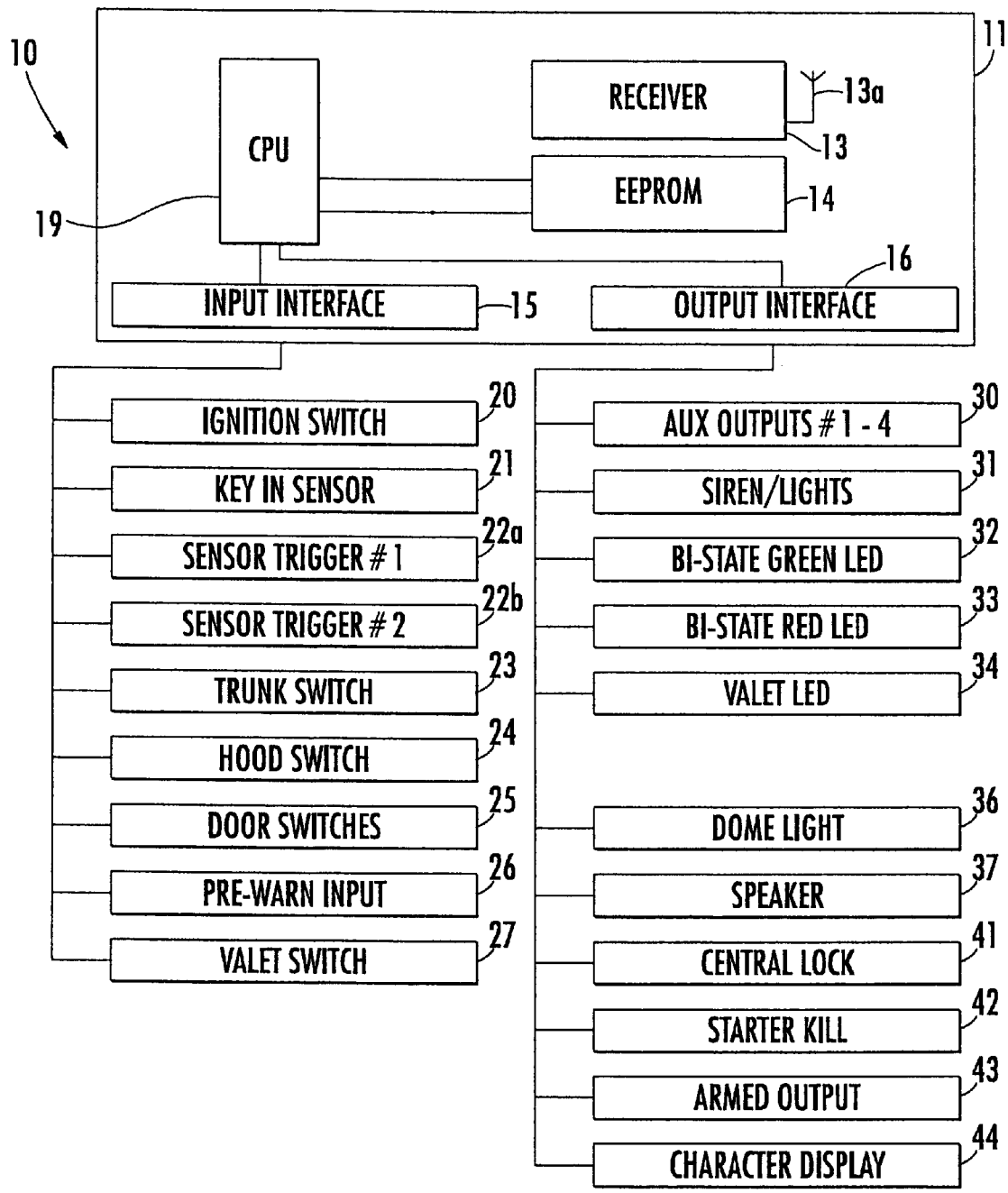
FIG. 3 is a more detailed schematic block diagram of a security system controller of the system in accordance with the present invention.

In one particularly advantageous embodiment of the invention, the function controller 34 is a security controller switchable between armed and disarmed modes responsive to the plurality of transmitters 51–53. Turning now additionally to FIG. 3, in one embodiment of the invention, the control module 10 for a vehicle security system is further described. The control module 10 includes a central processing unit (CPU) or microprocessor 19 operating under stored program control. In the illustrated embodiment, a receiver 13 and its antenna 13a are connected to the microprocessor 19 for receiving signals from the remote transmitter 51–53, which may be used to remotely arm and disarm the system, for example. The microprocessor 19 may also be operatively connected to an input interface 15 and an output interface 16. As would be readily understood by those skilled in the art, the microprocessor 19 may be connected to an external memory or alternately or additionally have its own on-board memory 14.

The input interface 15 is illustratively connected to various vehicle input devices including: an ignition switch 20; a key in the ignition sensor 21; two zone sensors 22a, 22b; conventional trunk hood and door pin sensors or switches 23, 24, and 25, respectively; and door lock switches 28. In addition, a pre-warn sensor 26 and valet switch 27 also provide inputs in the illustrated embodiment. As would be readily understood by those skilled in the art, other inputs are also contemplated by the present invention and are generally described herein by the term sensor.

The output interface 16 of the controller module 10 may preferably be connected to a plurality of output devices. The outputs may include auxiliary relay outputs 30, such as for window control, remote starting, or a remote alarm indication, as would be readily understood by those skilled in the art. A siren and/or lights 31, and green and red light emitting diodes (LEDs) 32, 33 for dashboard mounting are also illustratively connected to the controller 11. Other outputs may be directed to a valet LED 34, a dome light 36, a central lock relay or lock control unit 41, a starter kill circuit 42, and an armed relay output 43. In addition, other outputs may be directed to one or more of an audible tone generator 37, an alphanumeric display 44, a speech message annunciator 45, and a vibration transducer 46, as will be readily appreciated by those skilled in the art. Other similar indicating devices are also contemplated by the present invention, as would also be readily understood by those skilled in the art.

An alarm indicator in the form of a siren/lights 30 may also be connected to the controller 34 for sounding an alarm at the vehicle responsive to the plurality of transmitters 51–53 and/or to one or more vehicle security sensors. Of course, the controller 54 may comprise door lock control means for controlling locking and unlocking of vehicle doors responsive to the plurality of transmitters 51–53. In other words, the paging receiver 60 could also be adapted to work with a conventional remote keyless entry (RKE) system as will be readily appreciated by those skilled in the art. Accordingly, the user could have the remote control system unlock the vehicle doors by calling into the common carrier pager service 71, entering a unique personal identification number, and entering a door unlock command. Such a feature would be invaluable if the user locked the vehicle keys in the vehicle, for example.

The controller may also include engine disabling means, such as the schematically illustrated starter kill 42, for disabling the vehicle engine responsive to the plurality of transmitters 51–53. Accordingly, should the vehicle be stolen, the user may also dial into the common carrier paging service 71 and activate a command to disable the engine. The engine could also be remotely started. Those of skill in the art will appreciate other remote control functions that could be performed.

A method aspect of the invention is for retrofitting a paging remote control system to an existing vehicle control system. The existing vehicle control system is preferably of a type comprising at least one first transmitter 51, 52 for being carried by a user, a first receiver 13 positioned at the vehicle 12 for receiving signals from the plurality of transmitters, and a controller 54 positioned at the vehicle and being connected to wiring at the vehicle and to the first receiver for controlling at least one vehicle function responsive to the at least one transmitter. The method preferably comprises the steps of: positioning a second or paging receiver 60 at the vehicle for receiving signals via a common carrier paging network and for generating output control signals responsive to received signals from the common carrier paging network; and positioning a second transmitter 53 at the vehicle and connecting the second transmitter to the second receiver for communicating output control signals therefrom to the controller and via the first receiver.

In addition to the one-way paging feature described above, two-way paging could also be implemented if it was desired to enable a user to call his vehicle and obtain certain status information.

Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle remote control system comprising:
a plurality of wireless transmitters comprising at least one first wireless transmitter for being carried by a user;
a first wireless receiver positioned at the vehicle for directly receiving wireless signals frog said plurality of wireless transmitters;
a controller positioned at the vehicle and being connected to wiring at the vehicle and to said first wireless receiver for controlling at least one vehicle function responsive to said plurality of wireless transmitters; and
a second wireless receiver positioned at the vehicle for receiving wireless signals via a common carrier paging network and for generating output control signals responsive to received wireless signals from the common carrier paging network;
said plurality of wireless transmitters further comprising a second wireless transmitter positioned at the vehicle and connected to said second wireless receiver for communicating output control signals therefrom to said controller and via said first wireless receiver.

2. A vehicle remote control system according to claim 1 wherein said second wireless receiver includes a plurality of power inputs for connection to vehicle power; and wherein said second wireless transmitter includes power inputs connected in parallel with the power inputs of said second wireless receiver.

3. A vehicle remote control system according to claim 2 wherein output signals from said second wireless receiver are communicated to said controller only via said second wireless transmitter and said first wireless receiver.

4. A vehicle remote control system according to claim 1 wherein said controller is switchable between armed and disarmed modes responsive to said plurality of wireless transmitters.

5. A vehicle remote control system according to claim 1 wherein said controller comprises door lock control means for controlling locking and unlocking of vehicle doors responsive to said plurality of wireless transmitters.

6. A vehicle remote control system according to claim 1 wherein said controller comprises engine disabling means for disabling the vehicle engine responsive to said plurality of wireless transmitters.

7. A vehicle remote control system according to claim 1 further comprising an alarm indicator connected to said controller for sounding an alarm at the vehicle responsive to said plurality of wireless transmitters.

8. A vehicle remote control system according to claim 6 further comprising at least one vehicle security sensor operatively connected to said controller; and wherein said controller when in an armed state generates an alarm indication responsive to said at least one vehicle security sensor.

9. A vehicle remote control system according to claim 1 wherein said at least one first wireless transmitter comprises a battery power supply.

10. A vehicle remote control system according to claim 1 wherein said second wireless transmitter comprises a plurality of inputs for receiving respective pulsed input signals, and wherein said second wireless receiver comprises means for generating a plurality of pulsed output signals to the inputs of said second wireless transmitter.

11. A vehicle remote control system according to claim 1 further comprising at least one wiring harness connected at one end to said controller for interfacing said controller to wiring at the vehicle.

12. A vehicle remote control system comprising:
a plurality of wireless transmitters comprising at least one first wireless transmitter for being carried by a user;
a first wireless receiver positioned at the vehicle for directly receiving signals from said plurality of wireless transmitters;
a controller positioned at the vehicle and being connected to wiring at the vehicle and to said first wireless receiver for controlling at least one vehicle function responsive to said plurality of wireless transmitters; and
a second wireless receiver positioned at the vehicle for receiving wireless signals via a common carrier paging network and for generating output control signals responsive to received wireless signals from the common carrier paging network;
said plurality of wireless transmitters further comprising a second wireless transmitter positioned at the vehicle and connected to said second wireless receiver for solely communicating output control signals therefrom to said controller and via said first wireless receiver without wired interconnections.

13. A vehicle remote control system according to claim 12 wherein said second wireless receiver includes a plurality of power inputs for connection to vehicle power; and wherein said second wireless transmitter includes power inputs connected in parallel with the power inputs of said second wireless receiver.

14. A vehicle remote control system according to claim 12 wherein said controller is switchable between armed and disarmed modes responsive to said plurality of wireless transmitters.

15. A vehicle remote control system according to claim 12 wherein said controller comprises door lock control means for controlling locking and unlocking of vehicle doors responsive to said plurality of wireless transmitters.

16. A vehicle remote control system according to claim 12 wherein said controller comprises engine disabling means for disabling the vehicle engine responsive to said plurality of wireless transmitters.

17. A vehicle remote control system according to claim 12 further comprising an alarm indicator connected to said controller for sounding an alarm at the vehicle responsive to said plurality of wireless transmitters.

18. A vehicle remote control system according to claim 17 further comprising at least one vehicle security sensor operatively connected to said controller; and wherein said controller when in an armed state generates an alarm indication responsive to said at least one vehicle security sensor.

19. A vehicle remote control system according to claim 12 wherein said at least one first wireless transmitter comprises a battery power supply.

20. A vehicle remote control system according to claim 12 wherein said second wireless transmitter comprises a plurality of inputs for receiving respective pulsed input signals, and wherein said second wireless receiver comprises means for generating a plurality of pulsed output signals to the inputs of said second wireless transmitter.

21. A vehicle remote control system according to claim 12 further comprising at least one wiring harness connected at one end to said controller for interfacing said controller to wiring at the vehicle.

22. A paging remote control system for a vehicle control system of a type comprising at least one first wireless transmitter for being carried by a user, a first wireless receiver positioned at the vehicle for directly receiving signals from the plurality of transmitters, and a controller positioned at the vehicle and being connected to wiring at the vehicle and to the first wireless receiver for controlling at least one vehicle function responsive to the at least one wireless transmitter; said paging remote control system comprising:

a second wireless receiver positioned at the vehicle for receiving signals via a common carrier paging network and for generating output control signals responsive to received signals from the common carrier paging network; and a second wireless transmitter positioned at the vehicle and connected to said second wireless receiver for communicating output control signals therefrom to the controller and via the first receiver.

23. A paging remote control system according to claim 22 wherein said second wireless receiver includes a plurality of power inputs for connection to vehicle power; and wherein said second wireless transmitter includes power inputs connected in parallel with the power inputs of said second wireless receiver.

24. A paging remote control system according to claim 22 wherein output signals from said second wireless receiver are communicated to the controller only via said second wireless transmitter and the first wireless receiver.

25. A paging remote control system according to claim 22 wherein said second wireless transmitter comprises a plurality of inputs for receiving respective pulsed input signals, and wherein said second wireless receiver comprises means for generating a plurality of pulsed output signals to the inputs of said second wireless transmitter.

26. A method for retrofitting a paging remote control system to a vehicle control system of a type comprising at least one first wireless transmitter for being carried by a user, a first wireless receiver positioned at the vehicle for directly receiving signals from the plurality of transmitters, and a controller positioned at the vehicle and being connected to wiring at the vehicle and to the first wireless receiver for controlling at least one vehicle function responsive to the at least one wireless transmitter; the method comprising the steps of:

positioning a second wireless receiver at the vehicle for receiving signals via a common carrier paging network and for generating output control signals responsive to received signals from the common carrier paging network; and positioning a second wireless transmitter at the vehicle and connecting the second wireless transmitter to the second wireless receiver for communicating output control signals therefrom to the controller and via the first wireless receiver.

27. A method according to claim 26 wherein the second wireless receiver includes a plurality of power inputs for connection to vehicle power; wherein the second wireless transmitter includes a plurality of power inputs for connection to vehicle power; and further comprising the step of connecting the power inputs of the second wireless receiver and second wireless transmitter in parallel.

28. A method according to claim 26 further comprising the step of communicating output signals from the second wireless receiver to the controller only via the second wireless transmitter and the first wireless receiver.

29. A method according to claim 26 wherein the second wireless transmitter comprises a plurality of inputs for receiving respective pulsed input signals; and further comprising the step of generating a plurality of pulsed output signals from the second wireless receiver to the inputs of the second wireless transmitter.

* * * * *